Figure 1:
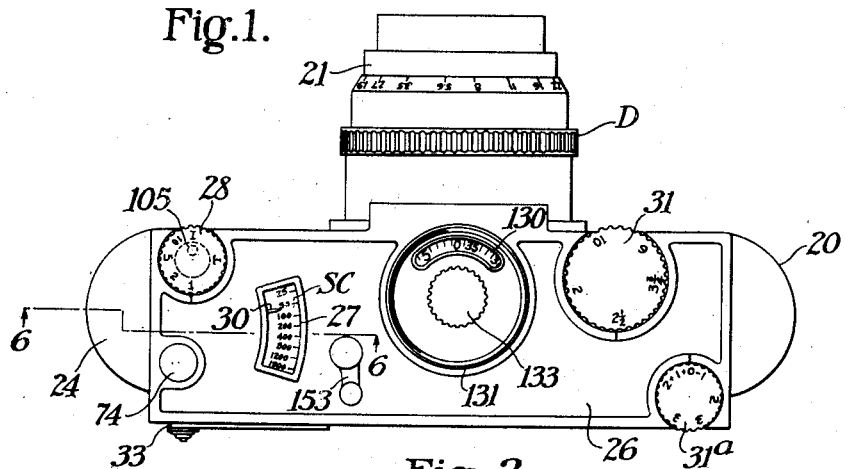

Jan. 9, 1940.　　　　J. MIHALYI　　　　2,186,614
MULTISPEED SHUTTER AND CONTROL THEREFOR
Filed Dec. 22, 1937　　　5 Sheets-Sheet 1

Joseph Mihalyi
INVENTOR

BY
ATTORNEYS

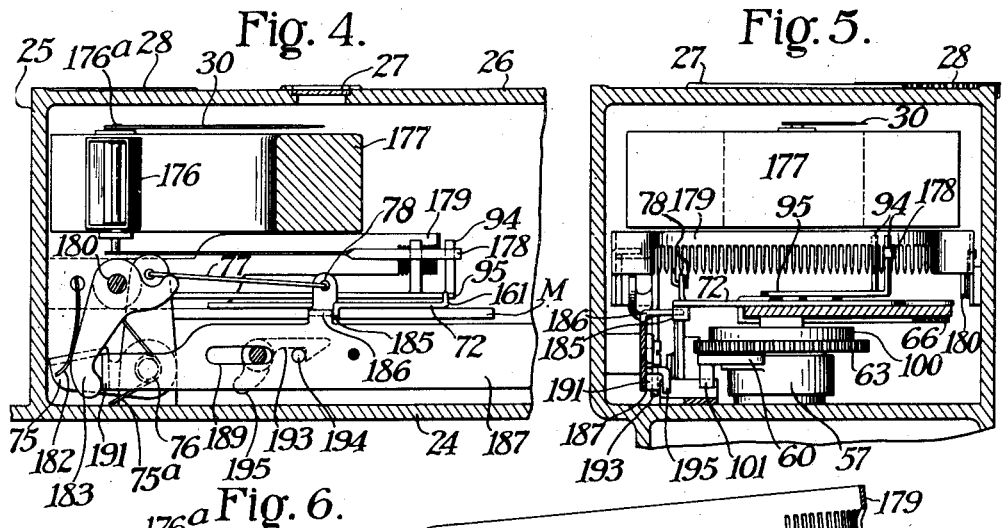
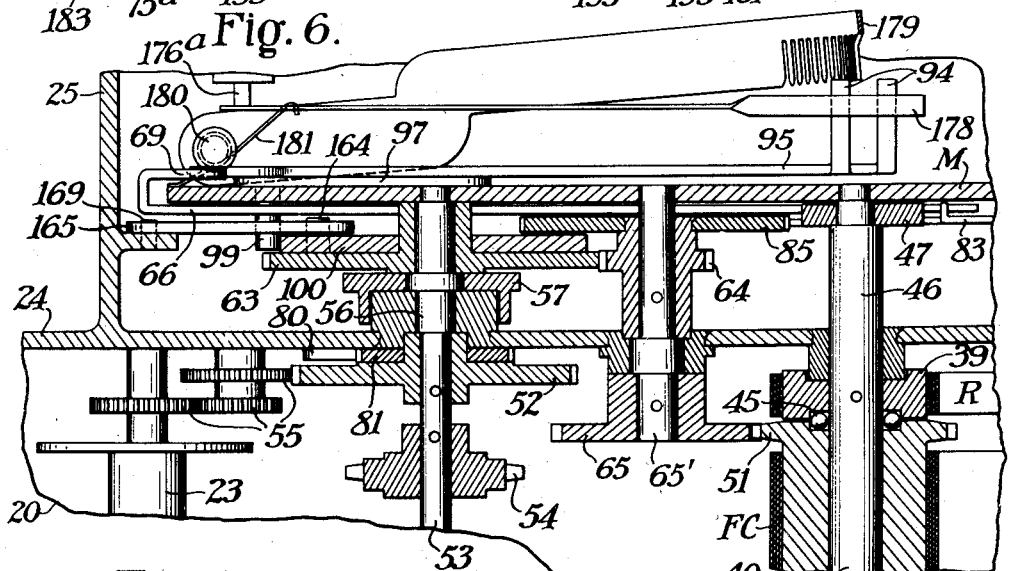
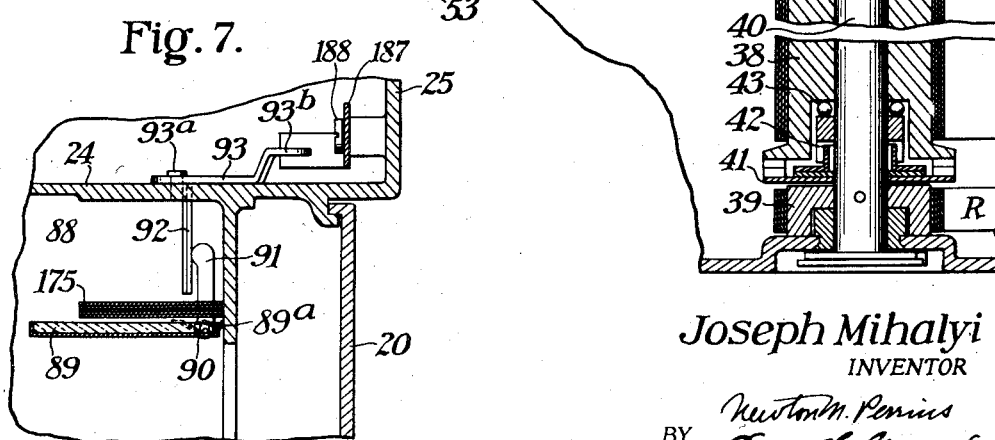

Jan. 9, 1940.  J. MIHALYI  2,186,614
MULTISPEED SHUTTER AND CONTROL THEREFOR
Filed Dec. 22, 1937  5 Sheets-Sheet 3
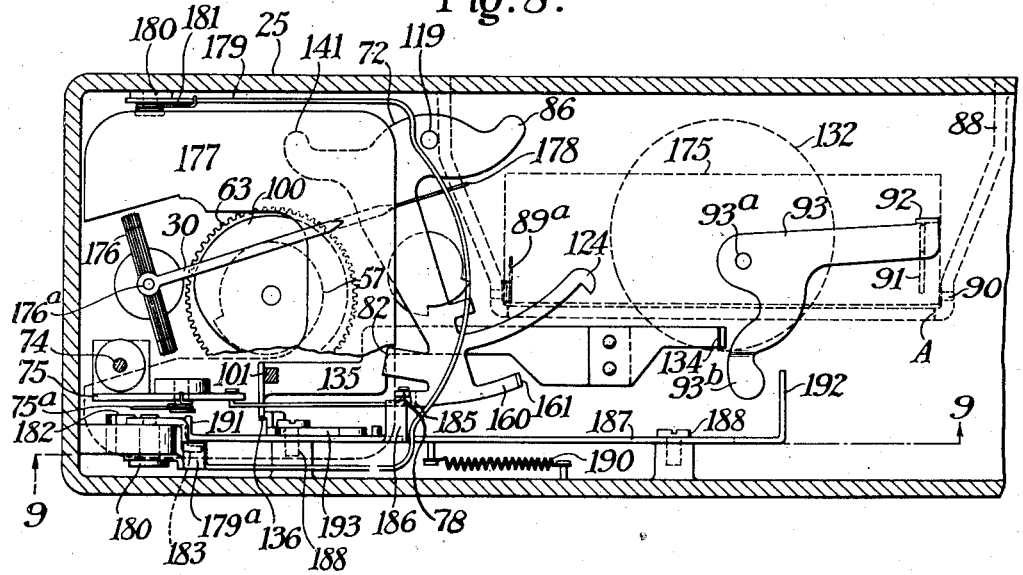
Fig. 8.
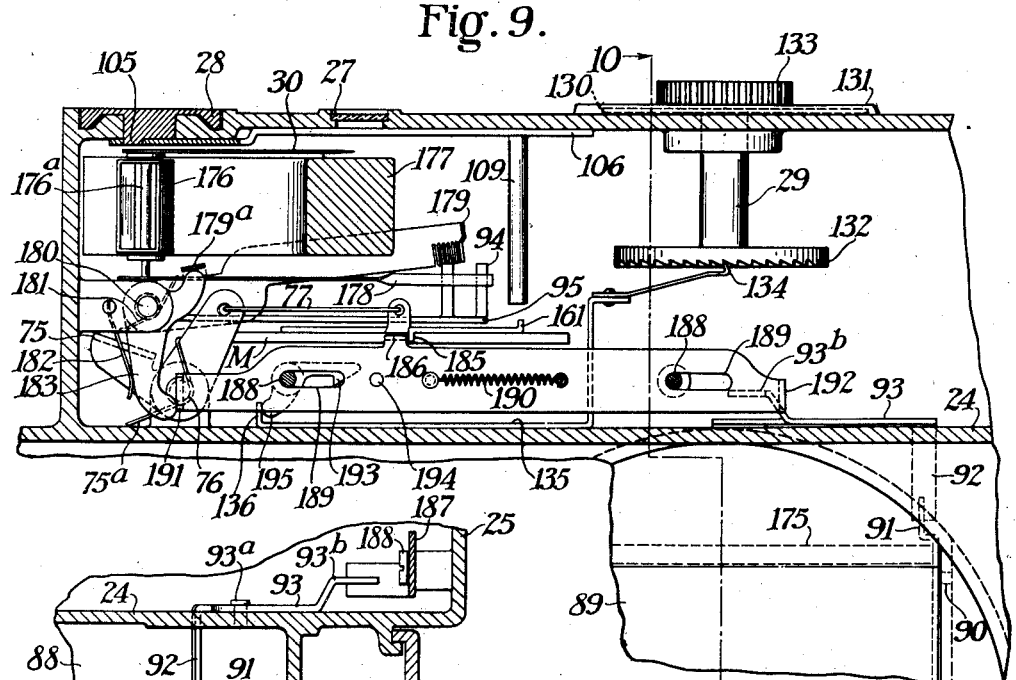
Fig. 9.
Fig. 10.
Joseph Mihalyi
INVENTOR
BY
ATTORNEYS Jan. 9, 1940.  J. MIHALYI  2,186,614
MULTISPEED SHUTTER AND CONTROL THEREFOR
Filed Dec. 22, 1937  5 Sheets-Sheet 4
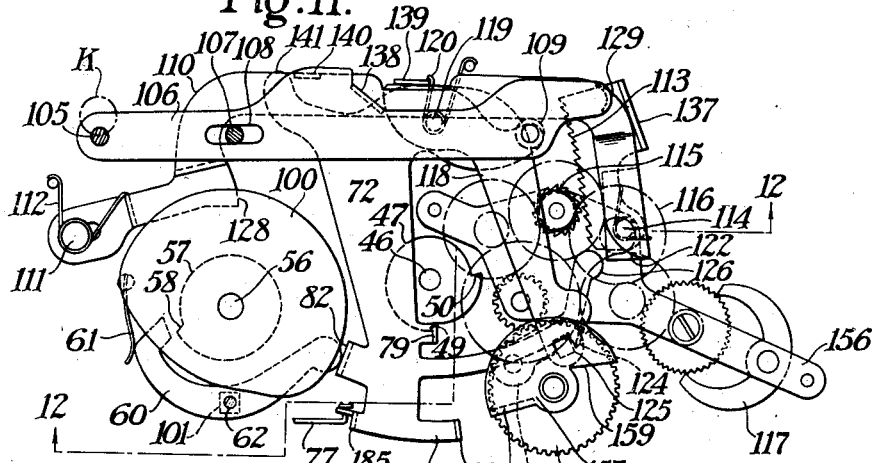
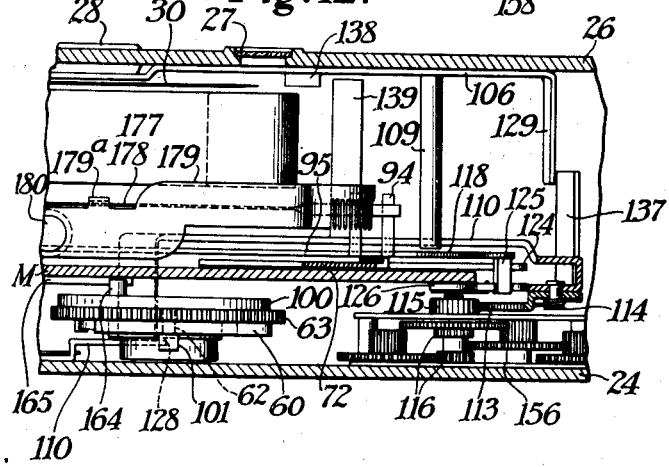
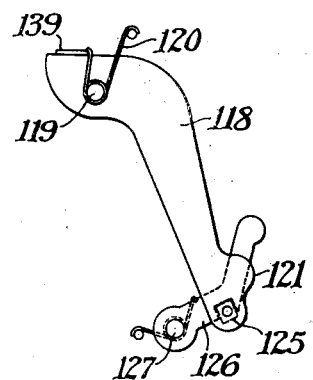
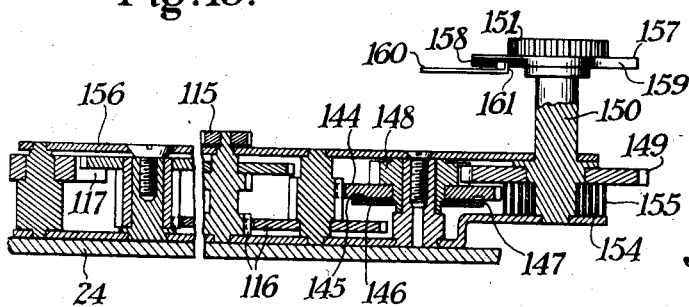
Joseph Mihalyi
INVENTOR

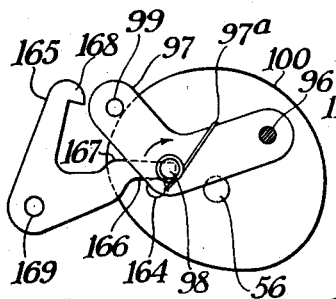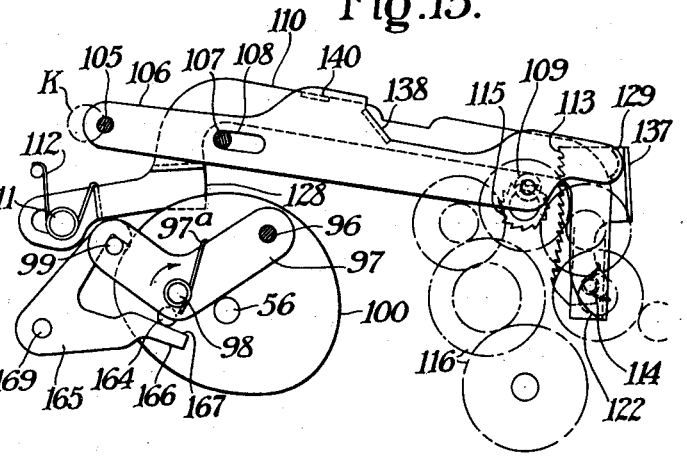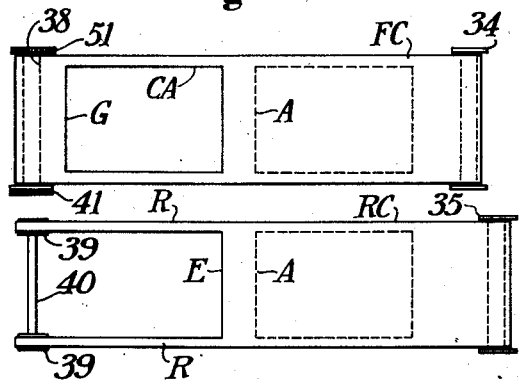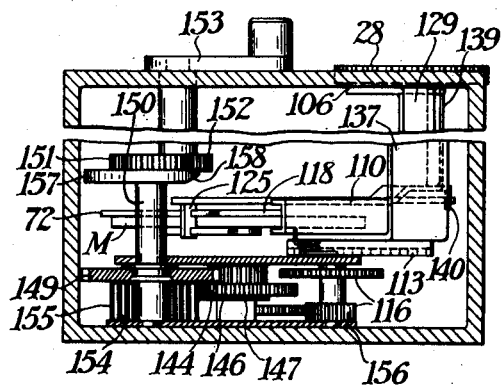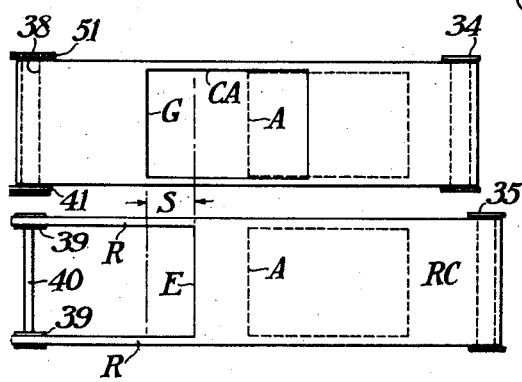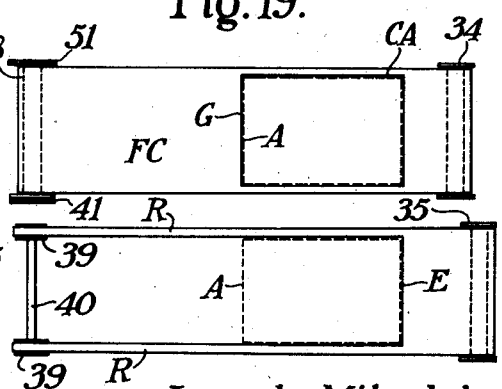

Patented Jan. 9, 1940

2,186,614

UNITED STATES PATENT OFFICE 2,186,614

MULTISPEED SHUTTER AND CONTROL THEREFOR

Joseph Mihalyi, Rochester, N. Y., assignor to Eastman Kodak Company, Rochester, N. Y., a corporation of New Jersey Application December 22, 1937, Serial No. 181,180

15 Claims. (Cl. 95—57)

This invention relates to photography and more particularly to shutters for cameras. One of the objects of my invention is to provide a camera with a shutter adapted to make a plurality of different exposures and more particularly to a shutter in which the plurality of exposures are divided into two groups of exposures, one group of which may be controlled automatically, and the second group of which may be controlled manually. Another object of my invention is to provide a shutter with a means for controlling fast speeds by means of the light conditions prevailing when the picture is to be taken and to provide a shutter having slow speeds which are separate from the control of the light-sensitive element and are manually controlled. Another object of my invention is to provide a shutter of the focal plane type in which two curtains are used with a slit between portions of the curtain for making an exposure. Another object of my invention is to provide a shutter of the type described in which the slit adjustment is controlled by a light-sensitive cell and in which variations in the width of the slit are made automatically by means of mechanism set by a light-sensitive cell actuated by light passing through a camera objective. Another object of my invention is to provide a shutter with a trigger mechanism which is adapted to reduce vibration to a minimum, the trigger being depressed to set the slit in the curtain shutter and being released to permit the curtains to pass across the exposure aperture to make an exposure. Still another object of my invention is to provide a shutter of the focal plane type in which the shutter curtains, when at full opening, may be retarded to make slow exposures by a gear retard. Another object of my invention is to control the slow exposures manually and to provide separate dials for fast or "hand" exposures and for slow or "stand" exposures. Another object of my invention is to provide a shutter of the type described in which the start of any selected exposure may be delayed for various predetermined time intervals. Another object of my invention is to provide a focal plane shutter in which a single retarding device is used for both producing a slow automatic exposure and for producing the delayed action before the exposure starts. Another object of my invention is to provide a trigger which can only be actuated when the shutter mechanism is fully wound. Still another object of my invention is to provide a shutter of the type described with two ranges of speeds, one range being controlled automatically by a light sensitive cell and the range of speeds being controlled manually through a gear retarding device. A still further object of my invention is to provide a camera shutter with a source of power which may be manually tensioned and which may be released regardless of the exposure which has been selected by means of a trigger and other objects will appear from the following specification, the novel features being particularly pointed out in the claims at the end thereof.

Figure 2:
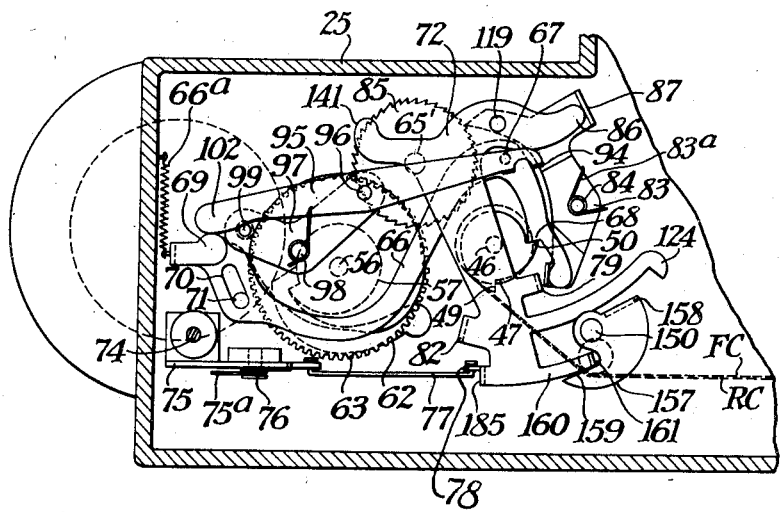
Figure 3:
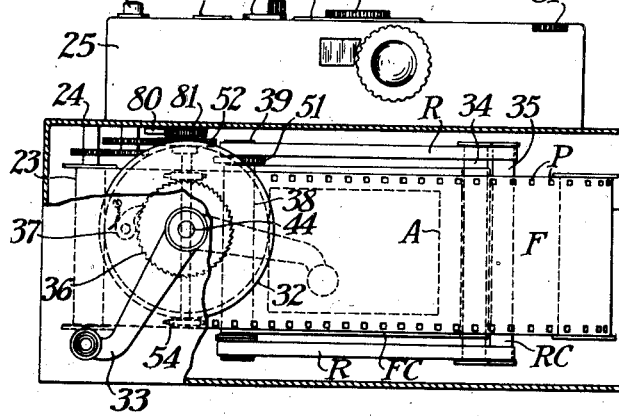

Coming now to the drawings wherein like reference characters denote like parts throughout:

Fig. 1 is a top plan plan view of a camera equipped with a shutter constructed in accordance with this invention, Fig. 2 is a fragmentary plan view, with the top of the control housing removed, showing certain operating and releasing parts as they appear when the shutter is wound ready for release, Fig. 3 is a rear elevation on a reduced scale, of the camera shown in Fig. 1, part of the back being removed to show some interior parts, Fig. 4 is a fragmentary vertical section of one end of the control housing, with the operating button depressed, Fig. 5 is a section looking toward the left in Fig. 4, Fig. 6 is an enlarged vertical longitudinal section through part of the control housing and the shutter winding rollers, Fig. 7 is a fragmentary vertical section taken on line 10—10 of Fig. 9, the parts being in locked position, Fig. 8 is a plan view of parts associated with the operating button for the purpose of operating a view-reflector and other elements, Fig. 9 is a vertical section taken on the line 9—9 of Fig. 8.

Fig. 10 is a section similar to Fig. 7 and taken on line 10—10 of Fig. 9, with the parts in normal position, Fig. 11 is a partial plan showing the time-exposure and delayed-exposure elements in released position, Fig. 12 is a section substantially on line 12—12 of Fig. 11, Fig. 13 is a section, somewhat diagrammatic, through the retarding gear-train assembly in Fig. 11, Fig. 14 is a fragmentary plan view of a latch member and associated parts, the shutter being "wound", Fig. 15 is a plan view of the same parts as shown in Fig. 14, with additional exposure-regulating members, the shutter being "unwound" or released, Fig. 16 is a fragmentary sectional elevation as if viewed looking toward the left of Fig. 12, Fig. 17 is a diagrammatic elevation of the shutter curtains when the shutter is wound, the two curtains being separated for clearness, Fig. 18 is a similar view showing the shutter "slit" or established aperture passing over the exposure aperture of a camera, Fig. 19 is similar to Figs. 17 and 18, both shutter curtains being shown in register with the exposure aperture of a camera.

Fig. 20 is a detail plan of two coacting parts.

Brief general description

In accordance with my invention, a camera may be provided with a shutter having a plurality of different exposures divided into two ranges of exposures one range of exposures being fast and being designated as "hand" exposures and the other range of exposures being relatively slow and being hereinafter referred to as "stand" exposures. It is usual to consider "hand" exposures as being exposures from approximately 1/25 of a second to the fastest exposure, in this case 1/1500 of a second. It is also customary to consider as "stand" exposures all exposures slower than 1/25 of a second, in this instance from 1/25 to one second.

The reason for this designation is that the normal operator can hold a camera still for 1/25 of a second and faster exposures but where slower exposures are used, a tripod or stand is necessary to prevent the camera from shaking. It is obvious that the limits of the two groups of exposure can be altered. However, I have found that the groups, as referred to above, are satisfactory and accordingly I have designed the present embodiment of my invention with a view of providing a shutter in which all "hand" exposures are automatically determined by means of a light-sensitive cell from the light conditions prevailing at the time the exposure is made and I have also provided separate means for adjusting the shutter manually for slower exposures of the "stand" variety. The camera may be equipped with a focal plane or curtain shutter consisting of two parts which may move independently. In normal operation, one depression of a release button causes one curtain to move relative to the other to form a slit between the two curtains and upon releasing the button, the curtains move together across the exposure aperture to make an exposure. It is the width of the slot between two curtains which determines the amount of exposure given and in the preferred embodiment of my invention I have provided an automatic means control by a light-sensitive cell for establishing the width of this slit.

On the other hand, for exposures utilizing the full width of the slot between the two curtains for producing exposures slower than 1/25 of a second, I have provided a manual means for retarding the movement of the curtains as they pass across the exposure aperture.

At each operation of the shutter, the source of power for the shutter—the springs—may be wound by a single lever which also winds a fresh area of film into place. Should the winding be incomplete, and the shutter springs only partially tensioned, it is impossible to release the shutter because the trigger is so positioned that it can cooperate with the shutter releasing latch only when the shutter is completely wound.

While in the illustrated embodiment of my invention, I have shown a shutter of the focal plane type as being applied to "miniature" cameras, obviously any size of film and camera can be used without departing from my invention.

Showing in drawings

Because the actual parts of the camera and shutter are so small, nearly all of the parts are shown on an enlarged scale. It should be noted at this time that an attempt has been made to avoid complicated, unreadable delineation, by omitting certain parts in some of the figures of the drawings. Some supports and parts that are omitted in some instances are, however, shown in other figures to illustrate their particular functions and, therefore, although each figure of the drawings may not be complete in itself, the structures associated therewith are shown in one figure or another in a manner that will make the invention understandable to those familiar with shutters and cameras in general.

Illustrated embodiment

The shutter embodying the present invention is illustrated as applied to a camera of the "miniature" type which is shown in plan view in Fig. 1, and which has a body 20 adapted to hold roll film, a focusing lens assembly 21, a supply spool 22 and a wind-up spool 23 for the film F which has edge perforations P (Fig. 3).

Built up from the top 24 of the camera body 20 is a chamber or housing 25 that contains parts of the shutter mechanism and controls, and which on its top 26 has a window 27 through which a scale SC is visible, this scale being calibrated in shutter speeds. A pointer 30 oscillates over the scale SC in accordance with the brightness of the subject towards which the camera is directed, as before mentioned, and indicates to the operator the shutter speed that will ensue, if the lens diaphragm remains at the aperture at which it is set when the scale is being read, as will be more fully described. If the pointer 30 is not visible, the operator will know that he must use a larger aperture and must manually reset the diaphragm accordingly by turning the ring D. The housing top 26 also carries a disc 31 and a smaller disc 31a, which may indicate required setting for the range-finder to compensate for lenses of different focal lengths. These latter, however, form no part of the present invention.

Curtain structure

When the shutter is wound, both curtains that constitute the shutter proper are rolled around their respective rollers, hereinafter designated as "wind-up" rollers, which receive the curtains in the wound and set position.

These curtains are shown, somewhat diagrammatically, in Figs. 17, 18 and 19, and are designated FC to represent the front curtain, or the one nearest the camera lens, and RC, the curtain nearest to the camera back. The curtain FC has an aperture CA, equivalent to the exposure frame A of the camera, while the curtain RC has an edge E adapted to cooperate with aperture CA to produce a variable width movable slit as will be presently described. Curtain FC has a foot roller 34 which is constantly urged counterclockwise to wind the curtain thereon (viewed from the top of the camera) by an internal spring, not shown, in the manner commonly employed in curtain shutters, whereby the curtain is carried across the exposure frame of the camera when released. Curtain RC is similarly pulled and rolled around another foot roller 35.

At the left side of the exposure aperture A of the camera is a shaft 40 to which narrow spools 39 are pinned (Fig. 6). These spools are adapted to receive ribbons R, attached to curtain RC at its edge E. The lower spool 39 carries a clutch disc 41 adapted to frictionally engage a toothed clutch member 42 that projects into a recess in the "wind-up" roller 38. The latter is adapted to receive the curtain FC when the winding or setting mechanism is operated. A ball bearing 43 at the top of the lower recess in roller 38 carries the weight of this roller so that it may rotate with minimum friction. The upper end of roller 38 also is recessed for balls 45, which constitute an anti-friction bearing between upper spool 39 and the roller 38.

A holding ratchet 47, having two teeth or shoulders 49 and 50 (see Figs. 2 and 11) is fixed to the top of shaft 40. A latch, later to be described, cooperates with this ratchet to hold or release the rear curtain RC by reason of the connection of the latter to the shaft 40 through the spools 39.

The roller 38, (Fig. 6) connected to the shaft 40 only through the friction clutch members 41 and 42, is controlled through suitable driving and holding means between a gear 51 which is part of roller 38, and a manual winding crank or lever 33 on the back of the camera (Fig. 3). This crank is mounted on a shaft 44 that extends through the camera back and carries a ratchet 36 constantly engaged by a pawl 37, the latter being mounted on the back of a crown gear 32. This crown gear, being free on the shaft 44, will be turned counterclockwise whenever the crank 33 is swung to the position shown in broken lines in Fig. 3. One or more of such movements accomplishes a complete winding of the shutter curtains and so fully "sets" the shutter. This structure is more completely described in my co-pending application Serial No. 137,483 filed April 17, 1937.

The crown gear 32 meshes with a spur gear 52 (Figs. 3 and 6) that is pinned to a shaft 53. Sprockets 54, spaced to engage perforations P in the film F, are also attached to shaft 53. These elements are so proportioned that movement of the crank 33 above mentioned will cause the shaft 53 to make one complete revolution, and the film F will be advanced one frame. The film wind-up spool 23 is driven from gear 52 through a gear train 55 and an overrunning clutch, not shown, to maintain the required film tension.

Certain parts of the mechanism, as will be clear by reference to Figs. 6, 12 and 16 are connected to or pivoted on a plate M, set on posts above the top wall 24 of the camera. For clearness, this plate has been omitted in all of the plan views of the drawings.

Shutter mechanism

The shaft 53 (Figure 11) has an extension 56 to which is fixed a holding ratchet 57, having a shoulder 58. A pawl 60, pivoted at 62, is normally held in engagement with shoulder 58 by a spring 61. The pivot 62 is a stud set into and extending downwardly from a gear 63, this gear being freely revoluble on shaft 56, so that if this shaft and the ratchet 57 are rotated clockwise (Fig. 2) as they will be whenever the winding lever 33 is moved as in Fig. 3, the pawl 60 and the gear 63 are rotated clockwise also, and gear 63, through idler gears 64 and 65 on a stud 65', drives gear 51 and, therefore, the curtain roller 38 in a clockwise direction to wind up both the front curtain FC directly, and the rear curtain RC through the friction disc clutch 41, into the relative positions diagrammatically illustrated in Fig. 17. To this end, a lever 66, hereinafter referred to as a latch lever (Fig. 2), is pivoted at 67 and has a shoulder or projection 68 adapted to intercept the shoulder 50 on ratchet 47 and thus to hold the shaft 46 and the spools 39, when wound, against counterclockwise rotation and preventing the rear curtain RC from passing over the exposure aperture A.

The end of the latch lever 66 shown at the left in Figs. 2 and 6 is turned up and toward the right and has a rounded portion 69. The lower portion of lever 66 has a slot 70 and a stationary pin 71 serves as a guide and a stop for limiting the swing of said lever. A spring 66a normally holds latch lever 66 in the position shown in Fig. 2.

Above lever 66 is a part 72, (Fig. 8) hereinafter designated as the release lever and this part is pivoted at 119. The function of lever 72 is primarily to disengage the latch lever 66 from the shoulder 50, but several other functions and movements of parts are accomplished as the release lever swings to left and right about the pivot 119.

Operating button for setting slit

The operating button or trigger 74, which is conveniently located so that it may be pressed by the operator's left index finger, is slidably mounted (Figs. 1, 3 and 8) at the upper left corner of the camera. A downward pressure on this trigger swings a bell-crank 75 about a pivot 76, against the action of a spring 75a, and through a link 77 that connects said bellcrank with an upturned lug 78 on the release lever 72, pulls the latter toward the left and into the position indicated in Fig. 11. At this point a lug 79 on lever 72 rests against shoulder 49 on holding ratchet 47, so that the latter cannot move counterclockwise even though latch 66 is disengaged from shoulder 50, as it is immediately, through means to be described. Ratchet 47, (Fig. 6) which is substantially integral with spools 39, cannot turn and, therefore, curtain RC cannot move across exposure aperture A, until the operator lifts his finger from button 74. The spring 75a (Figs. 2 and 4) tends at all times to raise the button 74, by acting on bellcrank 75 and therefore tends to move release lever 72 to the right.

Ratchet 57, fixed to shaft 56, although turned clockwise by the movement of winding crank 33 as previously described, cannot move counterclockwise at any time because of a pawl 80 pivoted on the underside of the camera top 24, that constantly engages a ratchet 81 also fixed to shaft 56 (Fig. 2). When lever 72 is moved to the position of Fig. 11, a lug 82 on said lever strikes the right end of pawl 60 and the gears 63, 64, 65 and 51, (Fig. 6) tend to rotate under the pull of the foot roller 34 to permit the curtain FC to pass over the aperture A to the roller 34. However, (Fig. 2) a pawl 83, pivoted at 84, moves to the left under the pressure of a spring 83a and engages a ratchet 85 that is fixed to gear 64. The latter, and therefore curtain FC, cannot move, even though pawl 60 is free from shoulder 58 of ratchet 57.

Trigger-shutter release

As the operator raises his finger from button 74, the spring 75a, (Fig. 4) through bellcrank 75 and link 77, moves release lever 72 toward the right, or counterclockwise about its pivot 119, until a prong 86 (Fig. 2) on said lever strikes a lug 87 on pawl 83 and disengages the latter from ratchet 85. The curtain FC is then free to be rolled onto the foot roller 34, and when it has moved a predetermined distance, to establish the exposure slit, the curtain RC is also released and said slit passes over the exposure aperture A. The width of the slit is controlled automatically, as previously mentioned, by the action of light from the subject or scene towards which the camera is directed, acting on a photo-electric element.

Speed selector

Referring to Figs. 4, 5, 7 and 10, the rear portion of the lens socket is recessed into the camera body as at 88 and has within it a mirror 89 that is mounted on a pivot 90 to swing through an arc of approximately 45 degrees, from the angular position of Fig. 10 up to the horizontal position of Fig. 7. A spring 89a tends to hold the mirror down. An arm 91, substantially normal to the mirror, is engaged by a depending lug 92 on a bell-crank 93, so that when the latter is rotated about its pivot 93a, the mirror is raised out of the path of the light rays passing through the lens assembly 21 and, when the bell-crank 93 is returned to its normal position, Fig. 8, the spring 89a returns the mirror again to the angular position. Light rays coming through the lens element will then be intercepted by the mirror and reflected onto a photo-voltaic element 175 that is fixed in a position parallel to the top wall 24 of the camera.

The cell 175 is connected to an armature coil 176 pivotally mounted at 176a in the field of a permanent magnet 177. The pointer 30 is fixed on the pivot 176a above the magnet and another pointer 178 is similarly arranged below the magnet, so that as the armature coil 176 oscillates under the influence of the micro-current generated in the cell 175, both pointers will move in unison. The only function of upper pointer 30 is to apprise the operator of the condition set up by the light factors affecting the cell 175. The lower pointer 178 however, has a function similar to a corresponding part illustrated in my U. S. Patent No. 2,058,483, issued October 27, 1936, namely, to be entrapped by a "comb" and when so trapped to act as a stop for another part, whereby the "slit" in the shutter curtains may be established at the required width.

The comb in this instance, indicated generally by reference numeral 179, is pivoted at 180 and is normally biased downwardly by a light spring 181. Opposing this spring is another and stronger spring 182 (Fig. 9) which presses against a lever 183, also pivoted at 180 and causes the upper end of said lever to engage a projecting lug 179a on the comb 179, thus normally elevating the comb to a position above the pointer 178 and leaving the latter free to oscillate. The lever 183 will be moved from the position where it elevates the comb, to a position which permits the spring 181 to move the comb downwardly, only when the operating button 74 is depressed. As before mentioned, the mirror 89 is also swung to its upper position (Fig. 7) when the button 74 is depressed. The invention as illustrated herewith employs the following arrangement of parts to accomplish these two actions simultaneously.

The release lever (Fig. 8) 72 has at its rear end a down-turned lug 185 that is adapted to strike an inturned lug 186 on a slidable bar 187 near the rear of housing 25. This slide bar is guided on screws 188, its movement being limited by slots 189. A spring 190 tends continuously to move the bar toward the right. When button 74 is depressed, the lug 185 strikes the lug 186, carrying bar 187 toward the left. Another lug 191, also a part of bar 187, then strikes the lower end of lever 183, turning the latter clockwise about the pivot 180 and causing the upper end of lever 183 to withdraw from contact with lug 179a. The comb 179 then is forced by its spring 181 downwardly over the pointer 178 to "trap" the latter.

The movement of the bar 187 towards the left also accomplishes the raising of the mirror 89, through a lug 192 on bar 187, striking the rear arm 93b of bell-crank 93 and swinging said bell-crank sufficiently to cause the depending portion 92 thereon to engage the arm 91 as previously described and to swing the mirror to the position of Fig. 7.

Provision is also made in the present embodiment of the invention whereby the comb cannot return to normal (elevated) position until after the shutter has been released. To this end a spring-pressed latch 193, (Fig. 9) in the form of a hook, is pivoted on one of the guide screws 188 and is adapted to engage a pin 194 on the bar 187 when the later is moved to the left as above described, thereby holding said bar against return.

The lower pointer 178 having been trapped and held by the comb 179 as above described, thus becomes a stop or speed selector which governs the width of the curtain "slit" in the following manner: A lever 95, hereinafter called the "interceptor" has an upturned forked end 94 that straddles the comb 179 and is pivoted at 96 on a bell-crank 97 (Figs. 2 and 9). The latter may be rotated about its own pivot 98 against the action of a spring 97a. This spring, by tending to rotate the bell-crank 97 clockwise (Figs. 14 and 15) about the pivot 98, presses a pin 99 that projects downwardly from one end of said bell-crank, into contact with the periphery of a cam 100, attached to the gear 63 (Fig. 6). A square pin 101 (Figs. 11 and 12) (actually an extension of pawl pivot 62) extends downwardly below the gear 63 and into the plane of latch 66 (Fig. 2). The left end 102 of interceptor member 95 lies in the plane of the upturned lug 69 on latch 66.

When the operator presses the button 74, the release lever 72 disengages the pawl 60 from the ratchet 57, while the shoulder 68 of latch 66 is holding ratchet 47 and curtain RC from unwinding or passing across the exposure aperture A. This movement permits pawl 83 to engage ratchet 85 and hold curtain FC from unwinding. When the button 74 is released, lever 72 moves toward the right and its end 86 disengages pawl 83 from ratchet 85. The pull of foot roller 34, transmitted through curtain FC and gears 51, 65, 64 and 63 rotates cam 100 counter clockwise and the curtain FC moves to approximately the relative position shown in Fig. 18.

During this movement, bell-crank 97 has been turned by its spring 97a and pin 99 has been brought into contact with the periphery of cam 100. As the latter rotates, the pin 99 follows it, so that the opposite end of the bell-crank 97, on which interceptor lever 95 is mounted, moves toward the back of the camera (Fig. 2). Member 95 is thus carried bodily in the same direction but, as the forked end 94 thereof strikes the pointer 178, the movement of the end 94 is arrested and the opposite end 102 then swings toward the back of the camera and strikes the upturned end 69 of latch 66. The contact of pin 99 with cam 100 has then stopped the curtain FC for an instant, but as soon as end 102 of member 95 strikes lug 69 as aforesaid, the latch 66 is swung about its pivot 67 in a counterclockwise direction and the shoulder 68 slips off from shoulder 50 on holding ratchet 47, thus releasing shaft 46. The curtains RC and FC then move together across the aperture A of the camera.

The combined effects of the position of pointer 178 and the contour of cam 100 determine the point at which the end 102 of interceptor 95 strikes the end of latch 66 and hence establishes the "slit" or distance between edge E of curtain RC and edge G of curtain FC.

Automatic exposures

In making exposures of 1/25 second, the full opening CA must pass unobstructed across the camera exposure aperture A. This will be accomplished by the simultaneous release of both curtains from the fully wound position (Fig. 2). When the operator desires to make an exposure of 1/25 second, he directs the camera at the scene to be taken and then turns the diaphram adjusting ring D on the lens assembly 21 until the pointer 30 is at 1/25 on the scale SC. The lower pointer 178 will then lie close against the forked end 94 of interceptor 95, so that the end 94 will not move at all when the bellcrank 97 begins to turn about the pivot 98. The result of this is that pawl 83 is disengaged from the ratchet 85 at the same instant that latch 66 is pushed away from ratchet 47. Both curtains then move together and the full aperture CA passes across camera aperture A and makes the required exposure.

When the cam 100 has made a full revolution counterclockwise, which occurs as the curtains pass over the exposure aperture A and come to rest, ready for rewinding, the square pin 101 (Fig. 8) strikes the left side of an upstanding lug 136 on a slideable bar 135, the latter being a part of the exposure-counter, to be more fully described later. The lug 136 is in line with the depending tail 195 of latch member 193 (Fig. 9), so that the latter is moved during the final few degrees of the full revolution of cam 100 above mentioned, sufficiently to raise the hooked end of latch 193 from pin 194, thus freeing the bar 187 which then is moved to the right by spring 190, permitting the mirror 89 to be returned to its angular position by the action of its spring 89a. Spring 182 is then free to swing lever 183 counterclockwise and the upper end thereof, by striking lug 179a, overcomes the pressure of spring 181 and raises the comb 179 above and free from the pointer 178. These parts then occupy their normal positions, as in Fig. 9. The shutter is then ready for rewinding and the camera will be ready to shoot another scene when the shutter is rewound.

Exposure counter

As the film F is advanced one frame each time the winding crank 33 is fully operated, by means of the sprocket 54, a recorder or exposure counter 29 is embodied in the camera which is operated automatically. This counter (Figs. 1 and 9) includes a calibrated dial 130, mounted in a suitable coverplate 131 and having a ratchet 132 on its under side corresponding to the calibrations. A knob 133 projecting above the coverplate 131 permits resetting of the dial manually.

Step by step rotation of the dial 130 is accomplished by a hook 134 (Fig. 9) on a slidable bar 135 that is suitably guided on the top 24 of the camera. A lug 136 projects upwardly from this bar and is so located that it will be struck by the square pin 101 (Fig. 8). This pin strikes the right side of lug 136 when the shutter is wound—i. e., when the ratchet 57, carrying pawl 60 with it, has been rotated 360° clockwise. This carries the slide bar 135 towards the left, so that hook 134, in engagement with one of the teeth 132, rotates dial 130 the space of one tooth, or one index numeral. When the shutter is released, and gear 63 and pawl 60 have rotated 360° counterclockwise, the pin 101 strikes the left side of lug 136 and moves slide bar 135 to the right a sufficient distance to engage the next ratchet tooth of dial 130. The slide bar 135 rests in this position until the shutter is again wound.

Slow automatic exposures

For speeds slower than 1/25, such as 1/10, 1/5, 1/2 and 1 second, a retarding mechanism is introduced, which is controlled by movement of the dial indicator 28. All "stand" exposures are therefore manually controlled through dial 28 (Fig. 1).

A pin 105 (Figs. 1 and 9) eccentrically mounted in dial 28, projects through the housing top 26 and engages a lever 106, pivoted at 107 (Fig. 11) and having a slot 108 to permit longitudinal movement. Obviously, as pin 105 describes a circle, indicated at K (Figs. 11 and 15), in being moved to various positions, the right end of 106 will be moved forward or backward or from right to left, and will, therefore, cause a pin 109 in said right end to assume various positions. The pin 109 (Fig. 11) constitutes a stop for a hooked member 110 that is pivoted at 111 and is constantly urged downwardly and toward the right by a spring 112. Member 110, (Figs. 11, 15), hereinafter referred to as the driver, carries at its free end a rack 113 that is pivoted at 114. This rack is adapted to engage a ratchet 115, mounted on an intermediate member of a gear train 116. This train is governed or retarded by a pallet 117, the whole train being mounted in a frame 156 attached to the top wall 24 of the camera.

An arm 118 (Fig. 20), pivoted at 119, is urged counterclockwise by a spring 120 so that its free end at 121 normally contacts a curved portion 122 on the free end of driver 110. Inasmuch as spring 112 constantly forces driver 110 toward the right, the latter is normally spaced away from ratchet 115. Spring 120 is stronger than spring 112.

When the release lever 72 is swung to the left as button 74 is pressed, a hook 124 on said lever engages a square pin 125 on the end of arm 118 and thereby swings this arm to the left so that pin 125 is caught and held by a spring latch 126, pivoted at 127. Thus the end 122 of driver 110 is no longer obstructed and may be moved to the left against the action of spring 112.

When the button 74 is released, with the parts set as above described, the curtain FC moves a sufficient distance to bring aperture CA into register with camera exposure aperture A. This is accomplished in exactly a half revolution of cam 100. The square pin 101 on gear 63 then contacts an abutment 128 on driver 110 and forces the entire driver toward the left (the pivot end being slotted as shown in Fig. 15) thus bringing rack 113 into engagement with ratchet 115. This movement of the driver 110 toward the left also causes its free end 122 to contact the free end of latch 126 and to disengage the latter from pin 125. Arm 118 is then swung counterclockwise by its spring 119 into contact with end 122 but cannot move driver 110 toward the right because of the continuing effort of pin 101 to force it to the left.

The pressure of arm 118 does, however, result in moving driver 110 forwardly, so that rack 113 traverses ratchet 115 and revolves the gear train as fast as permitted by pallet 117. The movement of the gear train permits rack 113 to be carried forwardly until driver 110 has moved to a point where the abutment 128 will slip off from pin 101, at which point the cam 100 under the pull of the curtain spring in foot roller 34 completes its revolution, and curtain FC closes camera aperture A, placing the shutter in condition for rewinding. Spring 112 then forces driver 110 toward the right, where rack 113 is again free from ratchet 115. The pin 101 and, therefore, the pawl 60, have thus been returned to the starting point (one complete revolution) and the pawl 60 is again in engagement with shoulder 58 on ratchet 57.

It is to be understood that the driver 110, when acting against the ratchet 115 as previously described in connection with exposures of 1/10, 1/5 etc. only moves the portion of the gear train 116 that is between washer 146 and pallet 117. The gear 144 (Fig. 13) under this condition rotates counterclockwise, so that the teeth 145 on its under side pass freely over the spring ends 147 of the washer 146. These parts will be more fully described under "Delayed action."

Time exposures

In operating the shutter for "time" exposures, the button 74 must be pressed and released, then pressed and released again. When the dial 28 is set for "T" the pin 105 has been moved to its farthest travel toward the right, as shown in fragmentary view, Fig. 15. In this position, the downturned end 129 of regulating lever 106 abuts an upstanding lug 137 on rack 113 and prevents the latter from engaging the ratchet 115 at any point in the operation of the shutter. Time exposures are considered as "stand" exposures, and together with the slow automatic exposures, are manually set through the dial 28, Fig. 1.

When the shutter is wound and ready for release, with the parts set for "time" exposures as above described, the first pressure of button 74 moves release lever 72 and frees pawl 60 from shoulder 58 of ratchet 57 as in higher speed operations and curtain FC passes over aperture A. Pin 101 strikes abutment 128 and thus aperture CA stops over exposure aperture A, as in Fig. 19. In moving the regulator 106 to farthest right position, a portion 138 (Fig. 11) thereon contacts a lug 139 on the lever 118 and swings the latter clockwise against the action of spring 120, so that pin 125 rests in latch 126. The end 121 of 118 then cannot interfere with movement of driver 110 toward the left.

A downturned lug 140 (Fig. 11) on driver 110 is so located that when the latter is in its normal position, an end projection 141 on release lever 72 will pass said lug when the release lever is moved to the left as button 74 is pressed. After button 74 is released, the pin 101 has pushed driver 110 to the left (as in Fig. 15) the lug 140 will lie in the path of travel of end 141 (Fig. 11). On the second pressure of button 74 this part 141 strikes lug 140, thus pushing the driver 110 forwardly against the action of spring 112, carrying the abutment 128 past the pin 101. The cam 100 is then free to complete the second half of its revolution as soon as button 74 is released. It is to be understood that curtain FC can never complete its movement and close aperture A until release lever 72 has swung to the right as the operator removes his finger from button 74. This movement then permits end 86 of the release lever to disengage pawl 83 from ratchet 85 leaving curtain FC free to be wound on foot roller 34. This latter holds true for all conditions of operation.

Delayed action

The shutter as illustrated herewith is also provided with a "delayed action" mechanism, whereby the operator may set the shutter and release the operating button, but the shutter will not be released until several seconds have elapsed, thus permitting the operator to take his own picture.

The gear train 116 as shown in the sectional view, Fig. 13, has at one point a gear 144 that is freely revoluble on a shouldered portion of a pinion 148. The latter is driven by a gear 149 that is mounted on a shaft 150. At the top of shaft 150 (Fig. 16) is a pinion 151 secured thereto, and meshing with a similar pinion 152. A crank 153 on the top of the housing 26 is fixed to pinion 152, and when swung from the position indicated in Fig. 1 to that indicated in Fig. 7, acts through the shaft 150 to wind a spiral spring 154, one end of which is attached to the shaft 150, the other end being attached to a stationary casing 155 which is fixed on the frame 156 that serves as a mounting for the entire gear train.

When the spring 154 is wound as aforesaid, the pinion 148 is rotated counterclockwise (viewed from above). A spring washer 146, (Figs. 13 and 16) is staked to the shank of pinion 148 and therefore revolves with it, so that two toothlike portions 147 of the washer 146, which in effect constitute a double pawl, will pass over ratchet teeth 145 on the underside of gear 144. If now, the spring 154 is released, which may be accomplished as later described, the driving energy of the spring will be transmitted through gear 149, pinion 148 and washer 146, the teeth 147 of which will then engage the ratchet teeth 145 and will drive the gear 144 in a counterclockwise direction, and this gear will drive the rest of the train 116, through to the governing pallet 117. The extent to which the spring 154 is wound, or the arc through which the operator moves the crank arm 153 in setting the "delayed action" determines the length of time the gear train will run and the relative speed of shaft 150. A full winding may run as much as 15 or 20 seconds depending on the design of the various members of the train.

The manner in which the retarded movement of shaft 150 is employed to cooperate with the shutter release mechanism, whereby the latter is permitted to move and release the shutter at the end of the gear train operation is as follows: Fixed on the shaft 150, under pinion 151, is a cam 157 (Fig. 13) of generally semi-circular form, and having one substantially radial edge 158 that is beveled on its underside, and another edge 159, not beveled, that is, in the present structure, approximately 200 degrees of arc from edge 158. At the unwound position of the delayed-action mechanism, the beveled edge 158 lies adjacent to an arm 160 that extends to the right and is part of release lever 72 (Figs. 2 and 11). As the operator moves the crank 153 clockwise, thus winding spring 154, the cam 157 rotates counterclockwise and the beveled edge 158 passes over the upturned end 161 of arm 160. The latter, being springy, will be depressed as the cam 157 rotates, but as soon as the cam has reached the fully wound position (Fig. 2) arm 160 springs up and its upturned end 161 blocks the cam 157 against rotation clockwise by contacting edge 159, and thus holds the spring 154 in wound condition. When the operator presses the button 74, the release lever 72 is moved to the left, as previously described, and the arm 160 is withdrawn from the edge 159 of the cam. The spring 154 immediately starts the gear train, the cam 157 begins to revolve clockwise, and as the operator releases the button 74 the lever 72 moves to the right and the upturned end 161 of arm 160 strikes and rides along on the semicircular periphery of the cam, thus preventing the complete return of release lever 72. As the gear train revolves, this relation is maintained until the unwound cam 157 has again reached the position of Fig. 11. The end 161 of arm 160 then slips past the edge 158, the lever 72 completes its return movement and, in so doing, frees pawl 83 from ratchet 85 as previously described to make an exposure.

The bellcrank 97, constantly urged in a clockwise direction about its pivot 98, tends to carry the pin 99 into contact with the periphery of cam 100 at all times. During the unwinding of the shutter this is necessary, in order to release the curtain FC as required to establish the correct "slit" between edge G of FC and edge E of RC, as previously described. On the clockwise or winding operation, however, the pin 99 should be clear of the cam and, therefore, a latch is provided, in the form of a bellcrank 165, pivoted at 169 (Fig. 15). A pin 164, projecting upwardly from cam 100 (Figs. 2, 15 and 16) strikes the edge 166 of one arm of the latch 165 (Fig. 15) when the shutter is wound, and throws the other arm of the latch, which carries a hook 168, away from the cam. As the cam 100 makes one revolution counterclockwise on the release movement, the pin 164 strikes the edge 167 and swings the member 165 to the position of Fig. 15, so that hook 168 lies in front of pin 99 and prevents spring 97a from pressing said pin toward the cam. Pin 99 is thus held out from the cam until the shutter is again rewound, or until the cam is turned a full revolution clockwise, to the position of Fig. 14.

Summary of operation

While the operation of the various parts has been described, the whole may be summarized as follows: If an operator desires a rapid exposure of say 1/1000 of a second, he directs the camera at the scene he proposes to photograph. If the pointer 30 then happens to be at 1/200, it is obvious that the lens aperture is too small, as this would indicate that 1/200 is the fastest speed possible with the existing aperture. The operator must then turn the diaphragm adjusting ring D, opening the diaphragm until the pointer 30 indicates 1/1000. If the pointer will not move to 1/1000 with the diaphragm fully opened, it is obvious that the subject toward which the camera is directed is not bright enough to permit such a short exposure. The operator, therefore, will have to be satisfied with the indicated speed. It is, therefore, to be understood that the total reflected light from the subject is the principal speed-limiting factor and the shutter cannot possibly be operated too fast for the scene. To prepare to take a picture, the handle 33 is moved to position a fresh area of film, thus winding the shutter curtains. When the button 74 is depressed, pawl 80 is freed from ratchet 87 but can move only just far enough to prevent reengagement because of the immediate engagement of pawl 83 with ratchet 85. When the button 74 is released, the front curtain F—C is carried along towards the foot roller 34 until the required slit is established and then the rear curtain R—C is released and both curtains then continue together across the aperture A to effect the exposure.

If a delayed exposure is desired, the crank 153 may be moved to wind spring 155 and the mechanism of the gear train releases the exposure operating parts at the end of the running-down action.

For all exposures of 1/25 second or faster, the pointer 30 is brought to the desired speed indicated on scale SC by opening or closing the lens diaphragm as above described. For slower speeds, the diaphragm is moved until the pointer 30 indicates 1/25 and then dial 28 is turned to the selected time, as for instance 1/2 second. The exposure is made as before by depressing button 74 to set the slit in the shutter and releasing the button to make the exposure.

With the button 74 described above which is released, instead of depressed as in known shutters, it is quite obvious that all tendency to shake the camera is eliminated since the operator is not overcoming tension on a spring at the instant an exposure is made. The movement of the button through its two paths for setting and releasing the shutter can be accomplished quickly and easily, and the tendency to move the camera is eliminated.

What I claim is:

1. In a shutter for cameras the combination with a casing having an exposure aperture, of moveably mounted members for uncovering and covering said exposure aperture, mechanism in the shutter casing for moving the moveably mounted members, a gear train mounted in the casing, a rack pivotally mounted to move to and from contact with a gear of the gear train, a dial on the outside of the casing, a lever inside of the casing and moveable by the dial to control the contact of the rack and gear, a power spring connected to a gear of the gear train, a handle outside the casing for setting the power spring, a cam operatively connected to the power spring, a shutter release lever, operable connections between said lever and the cam whereby the gear train may delay the start of an exposure and may also delay the duration thereof.

2. In a shutter for cameras the combination with a casing having an exposure aperture, of moveably mounted members for uncovering and covering said exposure aperture, mechanism in the shutter casing for moving the moveably mounted members, a gear train mounted in the casing, a rack pivotally mounted to move to and from contact with a gear of the gear train, a dial on the outside of the casing, a lever inside of the casing and moveable by the dial to control the contact of the rack and gear, a power spring connected to a gear of the gear train, a handle outside the casing for setting the power spring, a cam operatively connected to the power spring, a shutter release lever, operable connections between said lever and the cam, movement of the cam by the spring delaying operation of the shutter release, through movement of the gear train, said gear train being also adapted to delay the duration of exposure when said dial is set to control the contact of the gear and rack, the dial and lever being so proportioned that said lever may entirely prevent contact between said rack and gear.

3. In a photographic shutter for cameras, the combination with a casing, of shutter mechanism for producing a variety of differently timed exposures, a pivotally mounted interceptor for controlling the speed of an exposure, a latch positioned for engagement by the interceptor, an automatic photoelectric cell and an arm whose position is controlled thereby forming a stop for limiting movement of the interceptor for one range of exposures, means for moving the interceptor against said stop to trip said latch, a gear retard cooperating with the shutter mechanism, manual means for determining the retarding action of the gear retard for another range of exposures, a shutter spring, a handle for placing the shutter spring under tension, a trigger and connections including a second latch between the trigger and shutter mechanism for releasing the shutter mechanism to move under the impulse of its spring for an exposure in either range of exposures.

4. In a photographic shutter adapted to make a plurality of differently timed exposures, the combination with a casing containing shutter mechanism and an exposure aperture, of first and second movably mounted curtains for covering and uncovering the aperture to make an exposure, first and second latch elements for releasing the first and second curtains, springs for moving the curtains, a trigger for releasing the first latch, means for releasing the second latch after a predetermined time interval comprising a latch tripping interceptor adapted to engage the second latch, a movable stop positioned in the path of the arm for controlling the movement of the interceptor, said stop comprising an arm, a photoelectric cell for controlling the position of the said arm, in accordance with light conditions, a gear retard, and means for connecting the gear retard with the shutter mechanism for controlling the movement of the curtains when said gear retard is connected to the shutter mechanism.

5. In a shutter for cameras, the combination with an apertured shutter casing, of shutter members movably mounted therein for movement over the aperture for making an exposure, spring means for moving the shutter members, mechanism connecting the spring means and shutter members including latches, an interceptor, a pivotal mount in which the interceptor may swing, one end of the interceptor being adapted to swing through a path to release a latch and constituting with the latch a means for determining the duration of an exposure, two separate means for controling the interceptor to determine the exposure, one for controlling fast "hand exposures" and the other for controlling slow "stand" exposures.

6. In a shutter for cameras, the combination with an apertured shutter casing, of shutter members movably mounted therein for movement over the aperture for making an exposure, spring means for moving the shutter members, mechanism connecting the spring means and shutter members including latches, an interceptor, a pivotal mount on which the interceptor may swing, one end of the interceptor being adapted to swing through a path to release a latch and constituting with the latch a means for determining the duration of an exposure, two separate means for controlling the interceptor to determine the exposure, one for controlling fast "hand" exposures and the other for controlling slow "stand" exposures, one of said means including a photoelectric cell and a movable arm whose position is controlled thereby.

7. In a shutter for cameras, the combination with an apertured shutter casing, of shutter members movably mounted therein for movement over the aperture for making an exposure, spring means for moving the shutter members, mechanism connecting the spring means and shutter members including latches, an interceptor, a pivotal mount on which the interceptor may swing, one end of the interceptor being adapted to swing through a path to release a latch and constituting with the latch a means for determining the duration of an exposure, two separate means for controlling the interceptor to determine the exposure, one for controlling fast "hand" exposures and the other for controlling slow "stand" exposures, and the other of said means comprising a manually operable member.

8. In a shutter for cameras, the combination with an apertured shutter casing, of shutter members movably mounted therein for movement over the aperture for making an exposure, spring means for moving the shutter members, mechanism connecting the spring means and shutter members including latches, an interceptor, a pivotal mount on which the interceptor may swing, one end of the interceptor being adapted to swing through a path to release a latch and constituting with the latch a means for determining the duration of an exposure, two separate means for controlling the interceptor to determine the exposure, one for controlling fast "hand" exposures and the other for controlling slow "stand" exposures, one of said means including a photoelectric cell, and a movable arm whose position is controlled thereby, and means for holding said movable arm in the position to which it is moved by the photoelectric cell whereby it may serve as a stop for the interceptor.

9. In a shutter for cameras, the combination with an apertured shutter casing, of shutter members movably mounted therein for movement over the aperture for making an exposure, spring means for moving the shutter members, mechanism connecting the spring means and shutter members including latches, an interceptor, a pivotal mount on which the interceptor may swing, one end of the interceptor being adapted to swing through a path to release a latch and constituting with the latch a means for determining the duration of an exposure, two separate means for controlling the interceptor to determine the exposure, one for controlling fast "hand" exposures and the other for controlling slow "stand" exposures, and the other of said means comprising a manually operable member in the form of a dial, and time controlling mechanism operated thereby for controlling movement of said interceptor.

10. In a shutter for cameras, the combination with an apertured shutter casing, of shutter members movably mounted therein for movement over the aperture for making an exposure, spring means for moving the shutter members, mechanism connecting the spring means and shutter members including latches, an interceptor, a pivotal mount on which the interceptor may swing, one end of the interceptor being adapted to swing through a path to release a latch and constituting with the latch a means for determining the duration of an exposure, and automatic means for forming a stop for the interceptor and comprising a photoelectric cell, and a movable arm whose position is controlled thereby.

11. In a shutter for cameras, the combination with an apertured shutter casing, of shutter members movably mounted therein for movement over the aperture for making an exposure, spring means for moving the shutter members, mechanism connecting the spring means and shutter members including latches, an interceptor, a pivotal mount on which the interceptor may swing, one end of the interceptor being adapted to swing through a path to release a latch and constituting with the latch a means for determining the duration of an exposure, and automatic means for forming a stop for the interceptor and comprising a photoelectric cell, and a movable arm whose position is controlled thereby, said arm and said interceptor each being so pivoted as to have adjacent paths of movement, and fingers extending from the interceptor into the path of movement of the arm moved by the photoelectric cell whereby the interceptor may be automatically controlled thereby.

12. In a shutter for cameras, the combination with an apertured shutter casing, of shutter members movably mounted therein for movement over the aperture for making an exposure, spring means for moving the shutter members, mechanism connecting the spring means and shutter members including latches, an interceptor, a pivotal mount on which the interceptor may swing, one end of the interceptor being adapted to swing through a path to release a latch and constituting with the latch a means for determining the duration of an exposure, and automatic means for forming a stop for the interceptor and comprising a photoelectric cell, and a movable arm whose position is controlled thereby, and a manually adjustable time controlling mechanism for moving the interceptor forming a second means for controlling the duration of an exposure.

13. In a shutter for cameras, the combination with an apertured shutter casing, of shutter members movably mounted therein for moving over the exposure aperture for making an exposure, spring means for moving the shutter members, latches for controlling the operation of the spring means, a first latch controlling the shutter opening, a second latch controlling the shutter closing, a shutter trigger for operating the first latch for starting an exposure, and two separate means for operating the second latch, one of said means comprising a photoelectric cell, an arm whose position is controlled by the cell, and an interceptor, a spring for moving said interceptor into engagement with the cell arm and the second latch for tripping said latch after a time interval predetermined by the photoelectric cell.

14. In a shutter for cameras, the combination with an apertured shutter casing, of shutter members movably mounted therein for moving over the exposure aperture for making an exposure, spring means for moving the shutter members, latches for controlling the operation of the spring means, a first latch controlling the shutter opening, a second latch controlling the shutter closing, a shutter trigger for operating the first latch for starting an exposure, and two separate means for operating the second latch, one of said means including a spring, a gear train adapted to be moved by said spring, and a rack adapted to engage a gear of the gear train, manual means for controlling the engagement of the rack and gear and means operable upon the release of the rack and gear for tripping the second latch.

15. In a shutter for cameras, the combination with an apertured shutter casing, of shutter members movably mounted therein for moving over the exposure aperture for making an exposure, spring means for moving the shutter members, latches for controlling the operation of the spring means, a first latch controlling the shutter opening, a second latch controlling the shutter closing, a shutter trigger for operating the first latch for starting an exposure, separate mechanisms for controlling the shutter for relatively fast automatic exposures known as "hand" exposures and for controlling the shutter for slow automatic exposures known as "stand" exposures, said stand exposure automatic control including a spring, a gear train adapted to be moved by said spring and a rack adapted to engage a gear of the gear train, manual means for controlling the engagement of the rack and gear and means operable upon the release of the rack and gear for tripping the second latch, the fast automatic "hand" exposure control mechanism including a second latch releasing device composed of a selector movably mounted to contact with said latch, means for moving the selector, means for positioning the selector including a photoelectric cell and an arm whose position is controlled by the photoelectric cell whereby all "hand" exposures may be controlled automatically.

JOSEPH MIHALYI.